United States Patent
Nagatani et al.

[19]

[11] Patent Number: 5,852,613

[45] Date of Patent: Dec. 22, 1998

[54] AUTOMOBILE MULTIPLEX COMMUNICATION SYSTEM

[75] Inventors: Yuji Nagatani; Hiroshi Hashimoto, both of Wako, Japan

[73] Assignee: Honda Giken Kogyo Kabushiki Kaisha, Tokyo, Japan

[21] Appl. No.: 633,037

[22] Filed: Apr. 16, 1996

[30] Foreign Application Priority Data

Apr. 27, 1995 [JP] Japan ................................. 7-103876

[51] Int. Cl.⁶ ....................................................... H03H 7/01
[52] U.S. Cl. ............................................. 370/546; 333/12
[58] Field of Search .................................... 370/532, 451, 370/498, 463, 546; 307/9.1, 10.1, 89, 104; 333/12, 181, 167; 455/297

[56] References Cited

U.S. PATENT DOCUMENTS

| | | | |
|---|---|---|---|
| 4,760,355 | 7/1988 | Dash et al. | 333/12 |
| 4,992,060 | 2/1991 | Meyer | 333/12 |
| 5,095,296 | 3/1992 | Parker | 333/12 |
| 5,200,720 | 4/1993 | Yi | 333/181 |
| 5,504,737 | 4/1996 | Ichii et al. | 307/10.1 |
| 5,648,688 | 7/1997 | Nagatani et al. | 307/10.1 |

*Primary Examiner*—Chau Nguyen
*Attorney, Agent, or Firm*—Nikaido, Marmelstein, Murray & Oram LLP

[57] ABSTRACT

An automobile multiplex communication system has a plurality of control units mounted on an automobile and interconnected by a communication cable for multiplex communications therethrough between the control units. The communication cable has a uniform characteristic impedance and comprising a plurality of communication cable segments. A plurality of modified-impedance units, each having an impedance different from the uniform characteristic impedance, are each connected between adjacent two of the communication cable segments. The modified-impedance units are positioned in such locations on the communication cable that frequency bands of external noises tuned to the communication cable segments depending on their lengths are higher than a frequency band of a signal transmitted between the control units, and frequency bands of radiant noises tuned to the communication cable segments depending on their lengths are higher than a frequency band of a signal received by an electronic device mounted on the automobile.

9 Claims, 3 Drawing Sheets

AUTOMOBILE MULTIPLEX COMMUNICATION SYSTEM

BACKGROUND OF THE INVENTION

1. Field of the Invention

The present invention relates to an automobile multiplex communication system and more particularly to a wiring structure for an automobile multiplex communication system.

2. Description of the Related Art

In recent years, there have been developed automobile multiplex communication systems in which a plurality of control units each comprising a microcomputer or the like are installed on an automobile body and interconnected by a communication cable for multiplex communications between those control units. The communication cable which interconnects the control units generally comprises a cable having a uniform characteristic impedance or uniform frequency characteristics over its entire length.

In such automobile multiplex communication systems, the position for installing each of the control units is generally limited by the structure of the automobile body and structures for installing other automobile accessories. Therefore, the communication cable that is used cannot have a freely selected length, but should be of such a length which is determined by the positions where the control units are installed.

The communication cable functions as an antenna for receiving external noises in a frequency band corresponding to the length of the communication cable. Therefore, the external noises in their frequency band tend to be tuned to and picked up by the communication cable. If the frequency band of a signal to be transmitted through the communication cable differs from the frequency band of the external noises that are tuned to the communication cable (generally, the frequency band of the signal to be transmitted is lower than the frequency band of the external noises), then each of the control units can distinguish the transmitted signal, and the introduced external noises do not obstruct communications between the control units. However, the external noises which are mixed with the transmitted signal are likely to add impulse noises to the transmitted signal even if the frequency band of the external noises differ from the frequency band of the transmitted signal. Consequently, it has been customary in the art to use a suitable filter to reject the external noises that are tuned to the communication cable in order to prevent the control units from malfunctioning due to such external noises.

Communication cables of certain lengths allow external noises to be introduced in the frequency band which overlap the frequency band of a transmitted signal. When such external noises are tuned to the communication cable, each of the control units recognizes the external noises as a signal transmitted from another control unit. Since only the introduced external noises cannot be filtered out, the automobile multiplex communication system malfunctions due to the external noises. Inasmuch as the automobile multiplex communication systems which are available in recent years are designed for high-speed communications, their communication cables are likely to be tuned to external noises in those frequency bands which overlap the frequency band of a signal transmitted between the control units, and hence are apt to suffer noise-induced malfunctioning.

In many automobile multiplex communication systems, their control units themselves emit high-frequency noises. When such high-frequency noises are tuned to communication cables of the automobile multiplex communication systems, the high-frequency noises are radiated into space from the communication cables which function as antennas. If the frequency band of the high-frequency noises radiated from the communication cables overlaps the frequency band of a signal which is received by an automobile-mounted electronic device such as a radio receiver on the automobile, then the electronic device receives the high-frequency noises, and produces noisy sound or malfunctions.

According to one solution to the above problems, the length of a communication cable may be selected such that the frequency band of external noises tuned to the communication cable and the frequency band of high-frequency noises radiated from the control units through the communication cable will not overlap the frequency band of a signal transmitted between the control units and the frequency band of a signal received by an automobile-mounted electronic device such as a radio receiver on the automobile.

However, as described above, since the length of the communication cable is limited by the locations where the control units are installed, it is not possible to freely select the length of the communication cable for the purpose of protecting the automobile multiplex communication systems against unwanted noises.

SUMMARY OF THE INVENTION

It is therefore an object of the present invention to provide a wiring structure for an automobile multiplex communication system which has a simple arrangement for making the frequency band of external noises that are tuned to a communication cable interconnecting a plurality of control units of the automobile multiplex communication system, different from the frequency of a signal to be transmitted between the control units, irrespective of the locations where the control units are installed, so that communications between the control units are rendered resistant to noises.

Another object of the present invention is to provide a wiring structure for an automobile multiplex communication system which has a simple arrangement for making the frequency band of noises that are radiated from a plurality of control units of the automobile multiplex communication system through a communication cable, different from the frequency band of a signal received by an automobile-mounted electronic device such as a radio receiver irrespective of the locations where the control units are installed, so that noises which adversely affect the automobile-mounted electronic device such as a radio receiver are prevented from being radiated.

According to a first aspect of the present invention, there is provided an automobile multiplex communication system, comprising a plurality of control units mounted on an automobile, a communication cable interconnecting the control units for multiplex communications therethrough between the control units, the communication cable having a uniform characteristic impedance and comprising a plurality of communication cable segments, and a plurality of modified-impedance units each having an impedance different from the uniform characteristic impedance, each of the modified-impedance units being connected between adjacent two of the communication cable segments, the modified-impedance units being positioned in such locations on the communication cable that frequency bands of external noises tuned to the communication cable segments depending on their lengths are higher than a frequency band of a signal transmitted between the control units.

With the above first aspect of the present invention, the modified-impedance units each having an impedance different from the uniform characteristic impedance of the communication cable are positioned in the communication cable. The communication cable is divided by the modified-impedance units into the communication cable segments, each positioned one on each side of each of the modified-impedance units, which function as antennas for receiving external noises. Since the length of each of the communication cable segments is smaller than the entire length of the communication cable, the frequency bands of the external noises tuned to the communication cable segments are higher than would be if it were not for the modified-impedance units. The modified-impedance units are positioned in such locations on the communication cable that frequency bands of external noises tuned to the communication cable segments depending on their lengths are higher than a frequency band of a signal transmitted between the control units. Therefore, the frequency bands of the external noises tuned to the communication cable segments are different from the frequency band of the signal transmitted between the control units.

According to the first aspect of the present invention, therefore, the frequency bands of external noises tuned to the communication cable segments are different from the frequency band of the signal transmitted between the control units irrespective to the locations of the control units, and the signal transmitted between the control units is rendered highly resistant to noises.

In the first aspect of the present invention, it is preferable to connect the communication cable to the control units through filters for blocking the external noises tuned to the communication cable segments. Thus, the external noises tuned to the communication cable segments are prevented from being applied to the control units. The control units can therefore operate reliably without being influenced by the external noises.

According to a second aspect of the present invention, there is provided an automobile multiplex communication system, comprising a plurality of control units mounted on an automobile, a communication cable interconnecting the control units for multiplex communications therethrough between the control units, the communication cable having a uniform characteristic impedance and comprising a plurality of communication cable segments, and a plurality of modified-impedance units each having an impedance different from the uniform characteristic impedance, each of the modified-impedance units being connected between adjacent two of the communication cable segments, the modified-impedance units being positioned in such locations on the communication cable that frequency bands of radiant noises tuned to the communication cable segments depending on their lengths are higher than a frequency band of a signal received by an electronic device mounted on the automobile.

With the second aspect of the present invention, the modified-impedance units each having an impedance different from the uniform characteristic impedance of the communication cable are positioned in the communication cable. The communication cable is divided by the modified-impedance units into the communication cable segments, each positioned one on each side of each of the modified-impedance units, which function as antennas for radiating radiant noises from the control units in relatively high frequency bands. The modified-impedance units are positioned in such locations on the communication cable that frequency bands of radiant noises tuned to the communication cable segments depending on their lengths are higher than a frequency band of a signal received by an electronic device mounted on the automobile. Therefore, the frequency bands of the radiant noises tuned to the communication cable segments are different from the frequency band of the signal received by the electronic device.

According to the second aspect of the present invention, therefore, the frequency bands of radiant noises from the control units are different from the frequency band of the signal received by the electronic device irrespective to the locations of the control units, and the electronic device is prevented from being adversely affected by radiant noises radiated from the control units through the communication cable.

In the first or second aspect of the present invention, each of the modified-impedance units may comprise a ferrite core interposed in the communication cable, or a helical coil of turns of the communication cable itself, or a plurality of superimposed folds of the communication cable itself. Each of the modified-impedance units is thus of a simple structure.

According to a third aspect of the present invention, there is provided an automobile multiplex communication system, comprising a plurality of control units mounted on an automobile, and a communication cable interconnecting the control units for multiplex communications therethrough between the control units, the communication cable comprising a plurality of joined communication cable segments having respective frequency characteristics or respective characteristic impedance which are different from each other, the communication cable segments having respective lengths such that frequency bands of external noises tuned to the communication cable segments are higher than a frequency band of a signal transmitted between the control units.

With the third aspect of the present invention, the communication cable comprises a plurality of joined communication cable segments having respective frequency characteristics or respective characteristic impedance which are different from each other. Therefore, the communication cable is divided into the communication cable segments functioning as antennas for receiving external noises. The communication cable segments have respective lengths such that frequency bands of external noises tuned to the communication cable segments are higher than a frequency band of a signal transmitted between the control units. Therefore, the frequency bands of the external noises tuned to the communication cable segments are different from the frequency band of the signal transmitted between the control units.

According to the third aspect of the present invention, the frequency bands of the external noises tuned to the communication cable segments are different from the frequency band of the signal transmitted between the control units irrespective to the locations of the control units, and the signal transmitted between the control units is rendered highly resistant to noises.

In the third aspect of the present invention, it is preferable to connect the communication cable to the control units through filters for blocking the external noises tuned to the communication cable segments. Thus, the external noises tuned to the communication cable segments are prevented from being applied to the control units. The control units can therefore operate reliably without being influenced by the external noises.

According to a fourth aspect of the present invention, there is provided an automobile multiplex communication system, comprising a plurality of control units mounted on an automobile, and a communication cable interconnecting the control units for multiplex communications therethrough between the control units, the communication cable comprising a plurality of joined communication cable segments having respective frequency characteristics or respective characteristic impedance which are different from each other, the communication cable segments having respective lengths such that frequency bands of radiant noises tuned to the communication cable segments are higher than a frequency band of a signal received by an electronic device mounted on the automobile.

With the fourth aspect of the present invention, the communication cable is divided into the communication cable segments functioning as antennas for radiating radiant noises from the control units through the communication cable segments in relatively high frequency bands. The communication cable segments have respective lengths such that frequency bands of radiant noises radiated through the communication cable segments are higher than a frequency band of a signal received by the electronic device. Therefore, the frequency bands of the radiant noises radiated through the communication cable segments are different from the frequency band of the signal received by the electronic device.

According to the fourth aspect of the present invention, therefore, the frequency bands of the radiant noises radiated through the communication cable segments are different from the frequency band of the signal received by the electronic device irrespective to the locations of the control units, and the electronic device is prevented from being adversely affected by radiant noises radiated from the control units through the communication cable.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
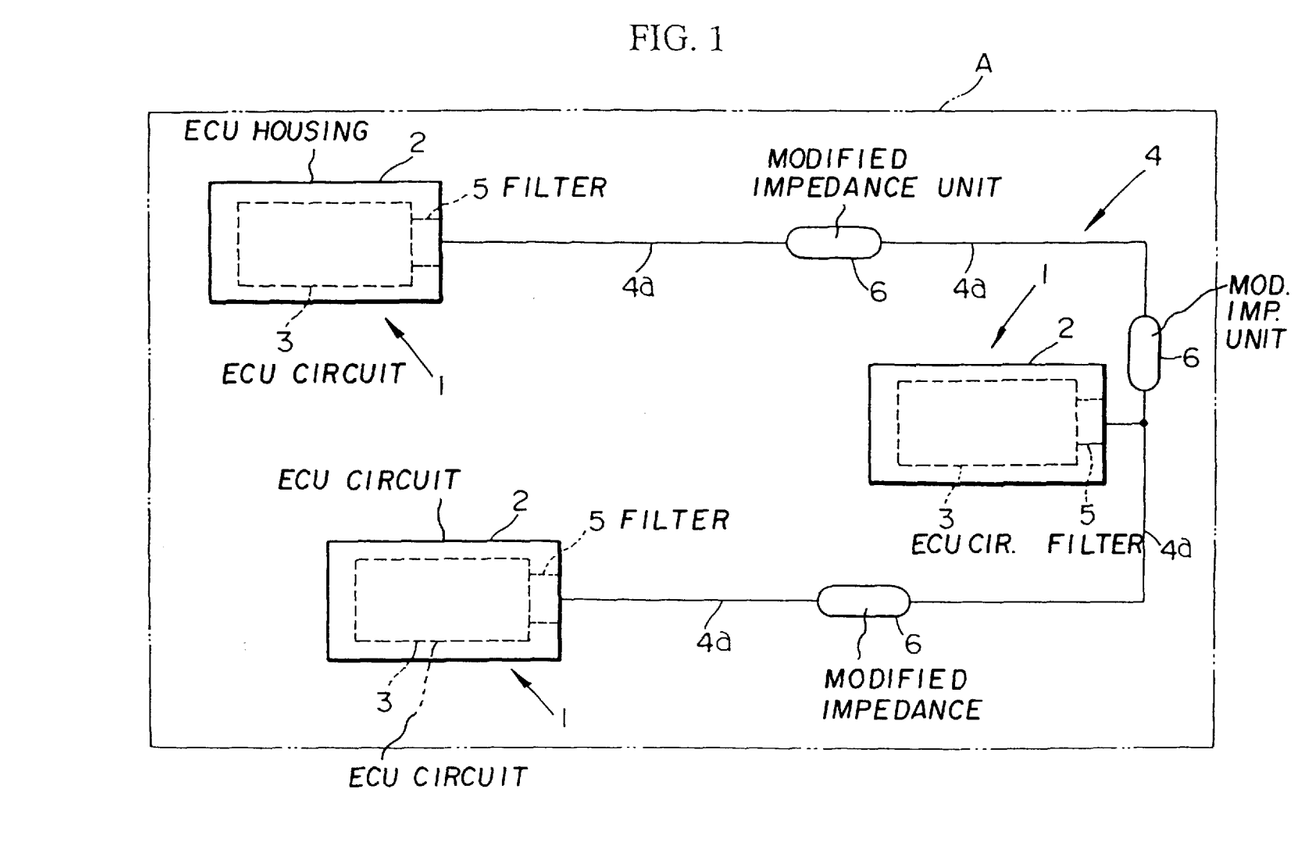
FIG. 1 is a schematic view of a wiring structure for an automobile multiplex communication system according to a first embodiment of the present invention.

As shown in FIG. 1, an automobile multiplex communication system which incorporates a wiring structure according to a first embodiment of the present invention has a plurality of (three, for example) electronic control units (hereinafter referred to as "ECUs") 1 installed in respective positions on an automobile A. The ECUs 1 have respective housings 2 which house respective circuits 3 including microcomputers, etc. The circuits 3 are interconnected by a communication cable 4 for mutual communications between the ECUs 1. The communication cable 4 is connected to the circuits 3 of the ECUs 1 through respective filters 5. The filters 5 serve to prevent external noises in a frequency band that is tuned to the communication cable 4 from entering the circuits 3, and also to pass a signal in a frequency band that is used for communications between the ECUs 1.

The communication cable 4 basically has a uniform characteristic impedance (an impedance per unit length) over its entire length. The communication cable 4 has a plurality of (three in the first embodiment) spaced modified-impedance units 6 each having an impedance that is different from the characteristic impedance of the communication cable 4.

Figure 2:
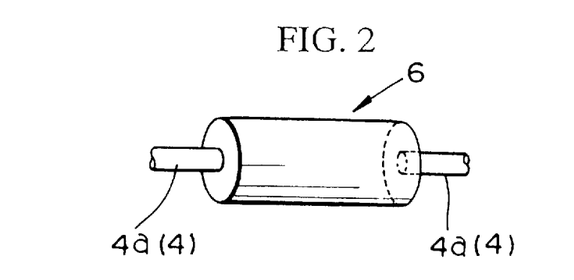
FIG. 2 is a perspective view of an impedance modifier for use in the wiring structure shown in FIG. 1.
Figure 3:
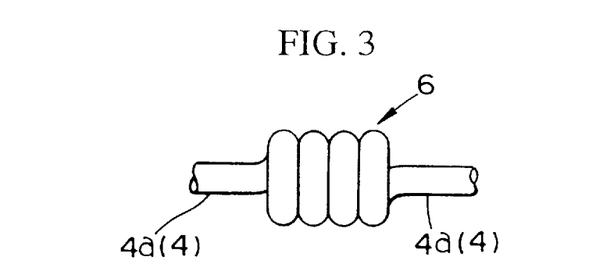
FIG. 3 is a perspective view of another impedance modifier for use in the wiring structure shown in FIG. 1.
Figure 4:
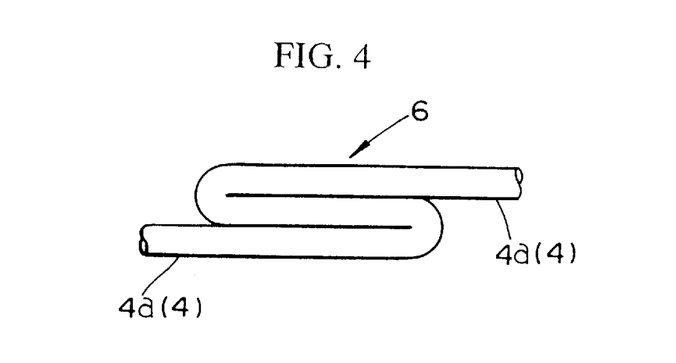
FIG. 4 is a perspective view of still another impedance modifier for use in the wiring structure shown in FIG. 1.

As shown in FIG. 2, each of the modified-impedance units 6 may comprise a ferrite core connected to the communication cable 4. Alternatively, as shown in FIG. 3, each of the modified-impedance units 6 may comprise a helical coil of turns of the communication cable 4 itself. Further alternatively, as shown in FIG. 4, each of the modified-impedance units 6 may comprise a plurality of superimposed folds of the communication cable 4 itself. Each of the modified-impedance units 6, which may be of either of the structures shown in FIGS. 2, 3, and 4, has a capacitance or inductance different from that of other portions of the communication cable 4, and hence has an impedance different from the characteristic impedance of the communication cable 4.

The modified-impedance units 6 functionally divide the communication cable 4 into a plurality of (four in the first embodiment) communication cable segments 4a, two of which are positioned one on each side of each of the modified-impedance units 6. Each of the communication cable segments 4a functions as an antenna depending on its length for receiving external noises.

Operation of the automobile multiplex communication system will be described below. When external noises are applied to the automobile multiplex communication system, the external noises in frequency bands corresponding to the lengths of the respective communication cable segments 4a are tuned to the communication cable segments 4a and introduced into the communication cable 4.

When the ECUs 1 produce radiant noises during their operation, the radiant noises in frequency bands corresponding to the lengths of the respective communication cable segments 4a are tuned to the communication cable segments 4a and radiated from the communication cable segments 4a into surrounding space.

The modified-impedance units 6 are positioned in such locations on the communication cable 4 that the frequency bands of the external noises tuned to the communication cable segments 4a depending on their lengths are higher than the frequency band (hereinafter referred to as a "communication frequency band" of a signal transmitted between the ECUs 1, and the frequency bands of the radiant noises tuned to the communication cable segments 4a depending on their lengths are higher than the frequency band (hereinafter referred to as a "reception frequency band" of a signal received by an automobile-mounted electronic device such as a radio receiver on the automobile A. Stated otherwise, the modified-impedance units 6 are positioned to provide the communication cable segments 4a of relatively short lengths to which there are tuned external and radiant noises in frequency bands that are higher than the communication and reception frequency bands.

Therefore, the frequency bands of external noises tuned to the communication cable segments 4a and introduced into the communication cable 4 are different from the communication frequency band for signal transmission between the ECUs 1. The ECUs 1 are thus prevented from recognizing the external noises as a signal transmitted therebetween.

The filters 5 comprise low-pass filters for blocking the frequency bands of the external noises (higher than the communication frequency band) tuned to the communication cable segments 4a. Consequently, the high-frequency external noises tuned to the communication cable segments 4a are prevented from being supplied to the circuits 3 of the ECUs 1, and the ECUs 1 receive a signal free of impulse noises which would otherwise be produced by the high-frequency external noises. The ECUs 1 operate normally without malfunctioning based on the supplied signal.

Because the frequency bands of the radiant noises radiated from the ECUs 1 through the communication cable segments 4a are higher than the reception frequency band, the automobile-mounted electronic device such as a radio receiver is prevented from produce noisy sound or malfunctioning.

In the first embodiment, the communication cable 4 is essentially of an integral unitary structure composed of the communication cable segments 4a with the modified-impedance units 6 interposed therebetween. However, the communication cable segments 4a may be separate from each other and interconnected by joints each comprising a modified-impedance unit 6 which may be of either one of the structures shown in FIGS. 2 through 4.

Figure 5:
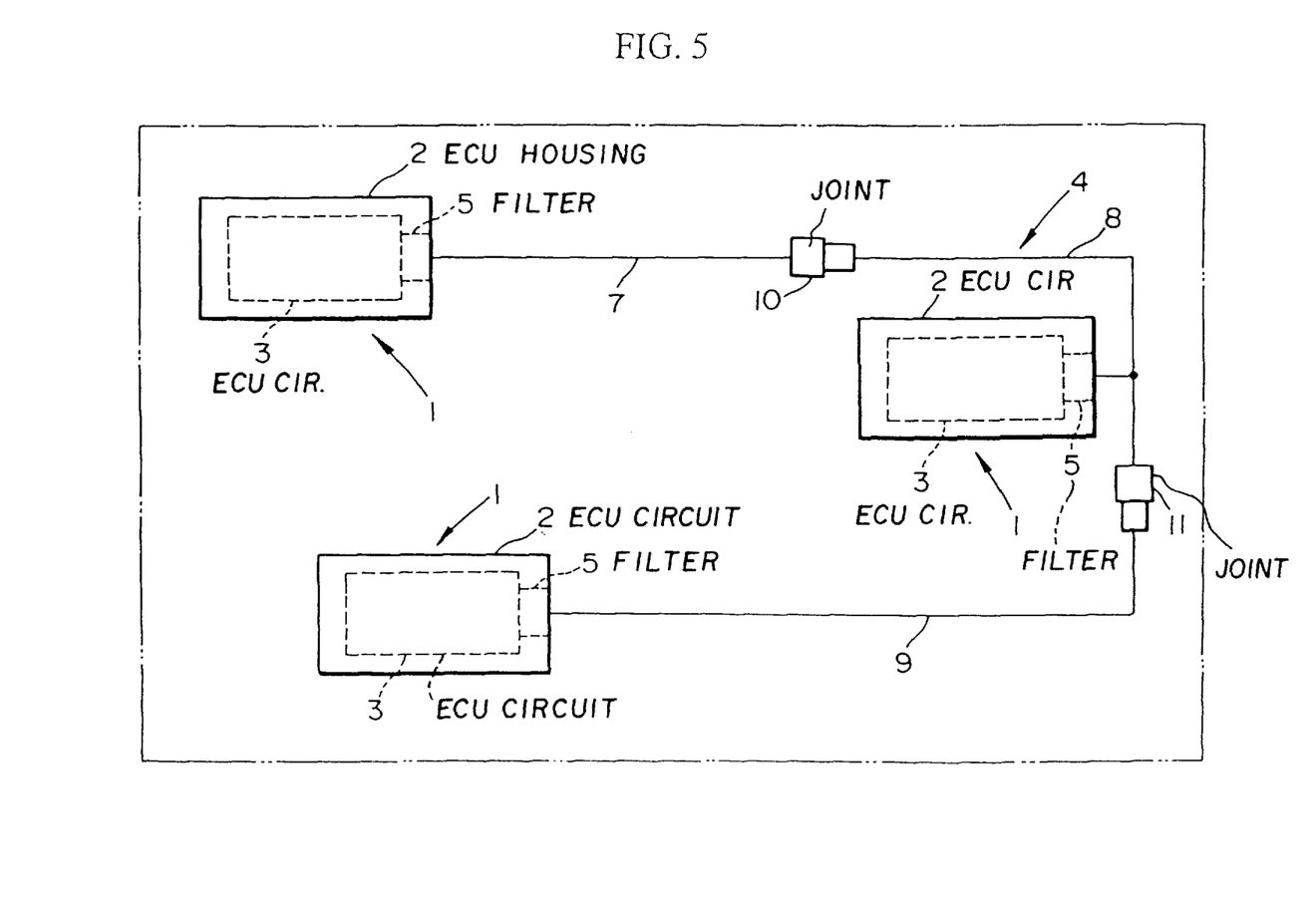
FIG. 5 is a schematic view of a wiring structure for an automobile multiplex communication system according to a second embodiment of the present invention.

FIG. 5 shows an automobile multiplex communication system which incorporates a wiring structure according to a second embodiment of the present invention.

The automobile multiplex communication system shown in FIG. 5 is basically of the same structure as the automobile multiplex communication system shown in FIG. 1. Those parts of the automobile multiplex communication system shown in FIG. 5 which are identical to those shown in FIG. 1 are denoted by identical reference numerals, and will not be described in detail below.

In the automobile multiplex communication system shown in FIG. 5, the three ECUs 1 are interconnected by a communication cable 4 which comprises three communication cable segments 7, 8, 9 having respective characteristic impedances different from each other. The communication cable segments 7, 8 are connected to each other by a joint 10, and the communication cable segments 8, 9 are connected to each other by a joint 11. The joints 10, 11 simply serve to electrically connect the communication cable segments 7, 8, 9.

The communication cable segments 7, 8, 9 have respective lengths, the sum of which is selected to correspond to the positions in which the ECUs 1 are installed on the automobile A. The lengths of the communication cable segments 7, 8, 9 are relatively small such that the frequency bands of external noises tuned to the communication cable segments 7, 8, 9 are higher than the communication frequency band and the frequency bands of radiant noises tuned to the communication cable segments 7, 8, 9 are higher than the reception frequency band.

The communication cable 4 which is composed of the communication cable segments 7, 8, 9 is connected to the circuits 3 of the ECUs 1 through the respective filters 5.

The communication cable segments 7, 8, 9 have different characteristic impedances to provide such an antenna function that external noises and radiant noises in frequency bands corresponding respectively to the lengths of the communication cable segments 7, 8, 9 can be tuned to the communication cable segments 7, 8, 9, respectively.

The frequency bands of external noises tuned to the respective communication cable segments 7, 8, 9 and introduced into the communication cable 4 are higher than the communication frequency band referred to above in the first embodiment. Accordingly, the ECUs 1 are prevented from recognizing external noises introduced into the communication cable 4 as a signal transmitted between the ECUs 1. Since the introduced external noises are blocked by the filters 5, the ECUs 1 receive a transmitted signal free of impulse noises, and the ECUs 1 operate normally without malfunctioning.

The frequency bands of radiant noises radiated from the ECUs 1 through the communication cable segments 7, 8, 9 are higher than the reception frequency band referred to above in the first embodiment. Consequently, an electronic device such as a radio receiver mounted on the automobile is prevented from producing noisy sound and also from malfunctioning.

In the second embodiment, the communication cable segments 7, 8, 9 have been described as having different characteristic impedances. However, communication cable segments 7, 8, 9 may have respective frequency characteristics which are different from each other.

The second embodiment of the invention could therefore be described as an automobile multiplex communication system which comprises a plurality of control units mounted on an automobile, and a communication cable interconnecting the control units for multiplex communications therethrough between the control units. The communication cable of this embodiment would comprise a plurality of joined communication cable segments having respective frequency characteristics or respective characteristic impedances which are different from each other. The communication cable segments have respective lengths such that the frequency bands of external noises tuned to the communication cable segments are higher than a frequency band of a signal transmitted between the control units. A plurality of filters may be provided for blocking the external noises tuned to the communication cable segments, with the communication cable being connected to the control units through the filters, respectively.

In the second embodiment, the communication cable could therefore comprise a plurality of joined communication cable segments having respective frequency characteristics or respective characteristic impedances which are different from each other. The communication cable segments would have respective lengths such that the frequency bands of radiant noises tuned to the communication cable segments are higher than a frequency band of a signal received by an electronic device mounted on the automobile.

Although certain preferred embodiments of the present invention have been shown and described in detail, it should be understood that various changes and modifications may be made therein without departing from the scope of the appended claims.

What is claimed is:

1. An automobile multiplex communication system, comprising:
   a plurality of control units mounted on an automobile;
   a communication cable interconnecting said control units for multiplex communications therethrough between said control units, said communication cable having a uniform characteristic impedance and comprising a plurality of communication cable segments; and
   a plurality of modified-impedance units each having an impedance different from said uniform characteristic impedance, each of said modified-impedance units being connected between adjacent two of said communication cable segments, said modified-impedance units being positioned in such locations on said communication cable that frequency bands of external noises tuned to said communication cable segments depending on their lengths are higher than a frequency band of a signal transmitted between said control units.

2. An automobile multiplex communication system according to claim 1, further comprising a plurality of filters for blocking the external noises tuned to said communication cable segments, said communication cable being connected to said control units through said filters, respectively.

3. An automobile multiplex communication system, comprising:

a plurality of control units mounted on an automobile;

a communication cable interconnecting said control units for multiplex communications therethrough between said control units, said communication cable having a uniform characteristic impedance and comprising a plurality of communication cable segments; and a plurality of modified-impedance units each having an impedance different from said uniform characteristic impedance, each of said modified-impedance units being connected between adjacent two of said communication cable segments, said modified-impedance units being positioned in such locations on said communication cable that frequency bands of radiant noises tuned to said communication cable segments depending on their lengths are higher than a frequency band of a signal received by an electronic device mounted on the automobile.

4. An automobile multiplex communication system according to any one of claims 1 through 3, wherein each of said modified-impedance units comprises a ferrite core interposed in said communication cable.

5. An automobile multiplex communication system according to any one of claims 1 through 3, wherein each of said modified-impedance units comprises a helical coil of turns of said communication cable itself.

6. An automobile multiplex communication system according to any one of claims 1 through 3, wherein each of said modified-impedance units comprises a plurality of superimposed folds of said communication cable itself.

7. An automobile multiplex communication system, comprising:

a plurality of control units mounted on an automobile; and a communication cable interconnecting said control units for multiplex communications therethrough between said control units, said communication cable comprising a plurality of joined communication cable segments having respective frequency characteristics or respective characteristic impedance which are different from each other, said communication cable segments having respective lengths such that frequency bands of external noises tuned to said communication cable segments are higher than a frequency band of a signal transmitted between said control units.

8. An automobile multiplex communication system according to claim 7, further comprising a plurality of filters for blocking the external noises tuned to said communication cable segments, said communication cable being connected to said control units through said filters, respectively.

9. An automobile multiplex communication system, comprising:

a plurality of control units mounted on an automobile; and a communication cable interconnecting said control units for multiplex communications therethrough between said control units, said communication cable comprising a plurality of joined communication cable segments having respective frequency characteristics or respective characteristic impedance which are different from each other, said communication cable segments having respective lengths such that frequency bands of radiant noises tuned to said communication cable segments are higher than a frequency band of a signal received by an electronic device mounted on the automobile.

* * * * *

(12) EX PARTE REEXAMINATION CERTIFICATE (5256th)
United States Patent
Nagatani et al.

(10) Number: US 5,852,613 C1
(45) Certificate Issued: Jan. 17, 2006

(54) AUTOMOBILE MULTIPLEX COMMUNICATION SYSTEM

(75) Inventors: Yuji Nagatani, Wako (JP); Hiroshi Hashimoto, Wako (JP)

(73) Assignee: Honda Giken Kogyo Kabushiki Kaisha, Tokyo (JP)

Reexamination Request:
No. 90/006,462, Nov. 26, 2002

Reexamination Certificate for:
Patent No.: 5,852,613
Issued: Dec. 22, 1998
Appl. No.: 08/633,037
Filed: Apr. 16, 1996

(30) Foreign Application Priority Data
Apr. 27, 1995 (JP) .............................................. 7-103876

(51) Int. Cl.
*H03H 7/01* (2006.01)

(52) U.S. Cl. ......................................... 370/546; 333/12
(58) Field of Classification Search ................ 370/532, 370/451, 498, 463, 546; 307/9.1, 10.1, 89, 307/104; 333/12, 181, 167; 455/297
See application file for complete search history.

(56) References Cited

U.S. PATENT DOCUMENTS 5,734,658 A  3/1998  Rall et al. ................... 370/438
5,852,613 A  12/1998  Nagatani ..................... 370/546

*Primary Examiner*—Kenneth Vanderpuye (57) ABSTRACT

An automobile multiplex communication system has a plurality of control units mounted on an automobile and interconnected by a communication cable for multiplex communications therethrough between the control units. The communication cable has a uniform characteristic impedance and comprising a plurality of communication cable segments. A plurality of modified-impedance units, each having an impedance different from the uniform characteristic impedance, are each connected between adjacent two of the communication cable segments. The modified-impedance units are positioned in such locations on the communication cable that frequency bands of external noises tuned to the communication cable segments depending on their lengths are higher than a frequency band of a signal transmitted between the control units, and frequency bands of radiant noises tuned to the communication cable segments depending on their lengths are higher than a frequency band of a signal received by an electronic device mounted on the automobile.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 3, 8 and 9 are cancelled.

Claims 1 and 4–7 are determined to be patentable as amended.

New claims 10 and 11 are added and determined to be patentable.

1. An automobile multiplex communication system, comprising:
   a plurality of control units mounted on an automobile;
   a communication cable interconnecting said control units for multiplex communications therethrough between said control units, said communication cable having a uniform characteristic impedance and comprising a plurality of communication cable segments; [and]
   a plurality of modified-impedance units each having an impedance different from said uniform characteristic impedance, each of said modified-impedance units being connected between adjacent two of said communication cable segments, said modified-impedance units being positioned in such locations on said communication cable that frequency bands of external *and/or radiant* noises tuned to said communication cable segments depending on their lengths are higher than a frequency band of a signal transmitted between said control units*; and*
   *a plurality of filters for blocking the external noises tuned to said communication cable segments, said communication cable being connected to said control units through said filters, respectively.*

4. An automobile multiplex communication system according to [any one of] claim[s] 1 [through 3], wherein each of said modified-impedance units comprises a ferrite core interposed in said communication cable.

5. An automobile multiplex communication system according to [any one of] claim[s] 1 [through 3], wherein each of said modified-impedance units comprises a helical coil of turns of said communication cable itself.

6. An automobile multiplex communication system according to [any one of] claim[s] 1 [through 3], wherein each of said modified-impedance units comprises a plurality of superimposed folds of said communication cable itself.

7. An automobile multiplex communication system, comprising:
   a plurality of control units mounted on an automobile; [and]
   a communication cable interconnecting said control units for multiplex communications therethrough between said control units, said communication cable comprising a plurality of joined communication cable segments having respective frequency characteristics or respective characteristic impedance which are different from each other, said communication cable segments having respective lengths such that frequency bands of external *and/or radiant* noises tuned to said communication cable segments are higher than a frequency band of a signal transmitted between said control units*; and*
   *a plurality of filters for blocking the external noises tuned to said communication cable segments, said communication cable being connected to said control units through said filters, respectively.*

*10. An automobile multiplex communication system according to claim 1, wherein the communication cable is of such a length which is determined by positions where the control units are installed.*

*11. An automobile multiplex communication system according to claim 7, wherein the communication cable is of such a length which is determined by positions where the control units are installed.*

* * * * *